R. BEVER.
SWIVEL HOOK.
APPLICATION FILED OCT. 17, 1916.
1,252,222.
Patented Jan. 1, 1918.
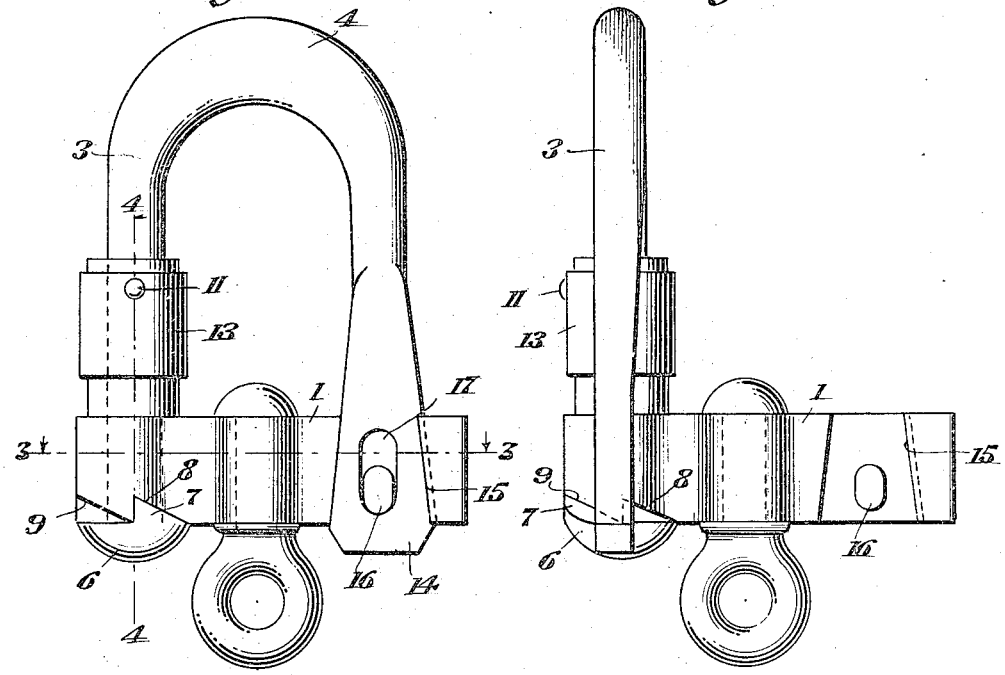
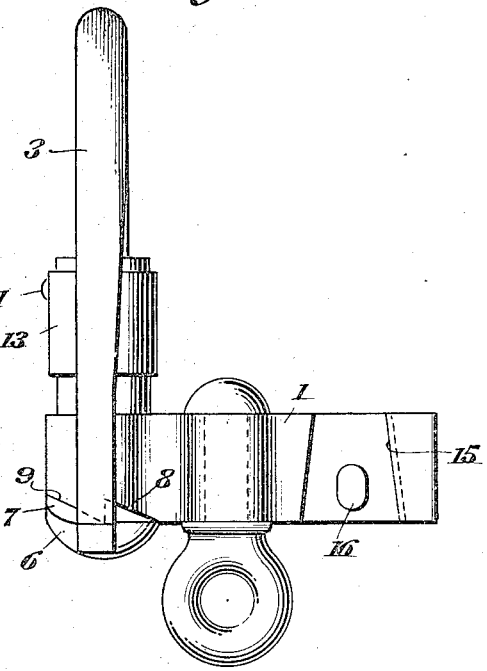
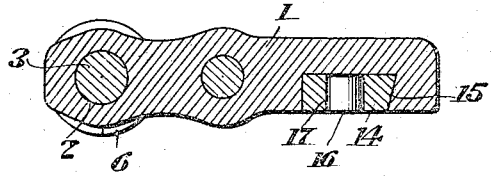
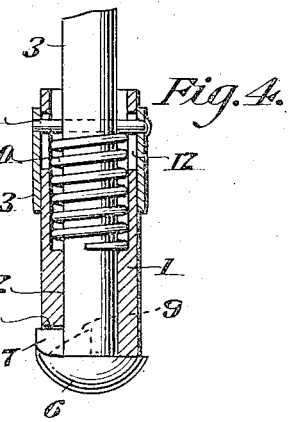
Witnesses
Inventor
Roy Bever
By Victor J. Evans
Attorney

UNITED STATES PATENT OFFICE.

ROY BEVER, OF CENTRALIA, WASHINGTON.

SWIVEL-HOOK.

1,252,222.      Specification of Letters Patent.      Patented Jan. 1, 1918.

Application filed October 17, 1916. Serial No. 126,161.

*To all whom it may concern:*

Be it known that I, ROY BEVER, a citizen of the United States, residing at Centralia, in the county of Lewis and State of Washington, have invented new and useful Improvements in Swivel-Hooks, of which the following is a specification.

This invention relates to swivel hooks intended for use in connection with logging.

The object of the present invention is to provide a hook of this character in which both of its ends are securely locked against accidental disengagement.

Another object of the invention is to provide a swivel hook in which the free end is automatically locked to provide for strengthening the hook and permitting the same to be manufactured from lighter material without in any way impairing its usefulness.

With the above objects in view the invention consists of the following novel combination and arrangement of parts illustrated in the accompanying drawings and pointed out in the appended claims.

In the drawings:—

Figure 1 is an elevation of a hook constructed in accordance with the invention, shown in its closed position;

Fig. 2 is a similar view with the hook open;

Fig. 3 is a longitudinal sectional view through the cross bar, on the line 3—3 of Fig. 1; and Fig. 4 is a detailed vertical sectional view illustrating the spring actuated means for holding the locking tooth in engagement with the cam notches.

In the practical embodiment of the invention as illustrated in the accompanying drawings, the improved hook comprises a cross bar 1 having near one of its ends an opening 2, designed to receive the swiveled end of a hook 3. This hook is of substantially U-shaped formation, being slightly thickened at 4, and having one of its ends 5 rounded so as to engage the opening 2. This end of the hook is formed with a head 6, provided with a locking tooth 7 for engagement with cam notches 8 and 9 formed in the cross bar 1.

As will be seen from Figs. 1 and 2 of the drawings, the hook 3 will be yieldingly held in a closed position when the tooth 7 engages the notch 8, and will be yieldingly held in an open position when the said tooth is in engagement with the notch 9. A coiled spring 10 surrounds the hook 3 adjacent the bar 1, and is confined between this bar and a cross pin 11 carried by the hook. An inner stationary guard sleeve surrounds the spring 10, and is provided with slots 12 within which the pin 11 is adapted to move. A short outer sliding sleeve 13 surrounds the stationary sleeve and normally covers the slots 12.

The opposite end of the hook 3 is flared as at 14 and is adapted to fit within a tapered dove-tailed recess 15 formed in the opposite end of the cross bar 1. A lug 16 seated within the recess 15 has a sliding engagement with an elongated slot 17 formed in the tapered end of the hook. It will thus be seen that in order to release the flared end 14 of the hook from the tapered dove-tailed recess 15, it will be necessary to slide the hook toward the enlarged end of this recess, before it can be moved laterally.

After the flared end of the hook is disengaged from the recess 15, and the tooth 7 is moved over the shoulder to engage the cam notch 9, the spring 10 will cause the tooth 7 to move along the cam surface of this notch and cause the hook 3 to assume a position at right angles to the cross bar 1, and be yieldingly held in this position by the said spring. When the hook is being closed, as soon as the tooth 7 passes over the shoulder to engage the notch 8 the end 14 of the hook will be automatically forced into the recess 15 and drawn inward toward the smaller end by the action of the spring 10.

Various changes in the form, proportion and details of construction of the invention may be made as will properly fall within the scope of the claims.

Having described the invention, what I claim is:

1. A swivel hook comprising a cross bar, a hook swiveled therein, the free end of said hook adapted to engage a tapered dove-tailed recess in said bar, and a lug in said recess adapted to enter an elongated slot in said bar.

2. A swivel hook comprising a cross bar, a hook swiveled therein, cam notches formed in said bar, a spring pressed locking tooth carried by said hook, an elongated end upon said hook for engagement with a tapered dovetailed notch formed in the cross bar, a lug located in said notch and engaging an elongated slot formed in the enlarged end of the hook, and an eye swiveled in the cross bar.

3. A device of the class described comprising a crossbar, a hook having one end rotatably mounted therein, means for locking the opposite end of said hook to said bar and means included in the rotatably mounted means of the hook for automatically adjusting the said opposite end into locking engagement with the said bar.

4. A device of the class described comprising a crossbar, a hook having one end rotatably mounted therein, means for locking the free end of said hook to said bar and means whereby, the hook is automatically moved transversely of the cross bar for adjusting the free end thereof into locking engagement.

5. A device of the class described comprising a crossbar, a hook having one end rotatably mounted therein, means for locking the free end of said hook to said bar and means whereby, said hook may be moved transversely with respect to the bar to release the locking means.

In testimony whereof I affix my signature.

ROY BEVER.

Copies of this patent may be obtained for five cents each, by addressing the "Commissioner of Patents, Washington, D. C."